April 17, 1951 — B. R. FOX — 2,548,962
GYNECOLOGIC INSTRUMENT IN THE NATURE
OF A DIAPHRAGM INSERTER
Filed Aug. 9, 1948
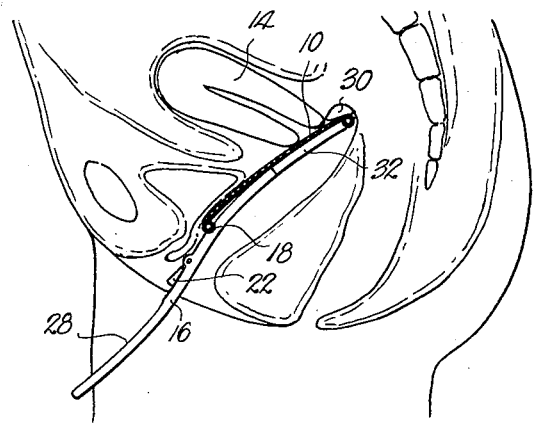
Fig. 1.
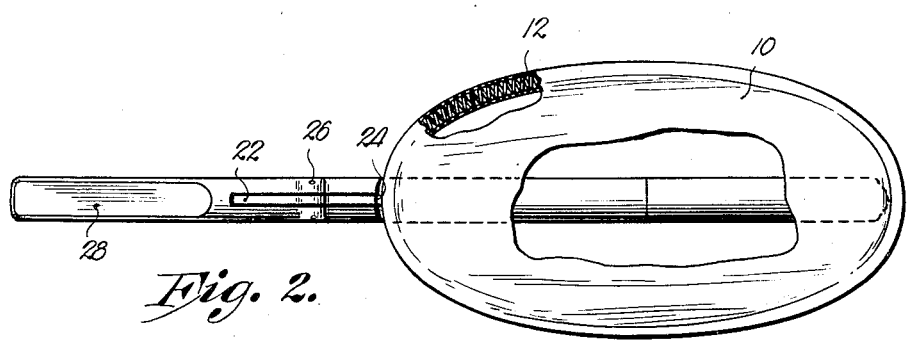
Fig. 2.
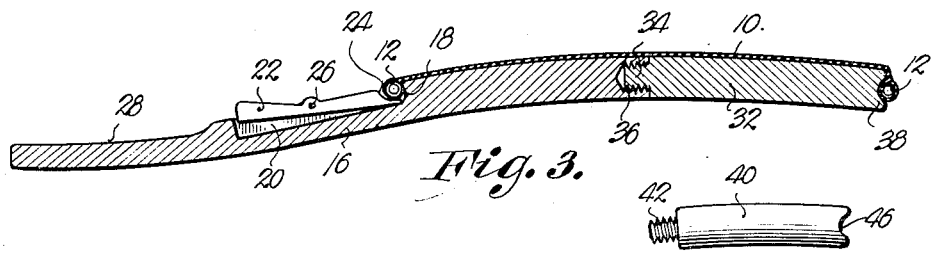
Fig. 3.
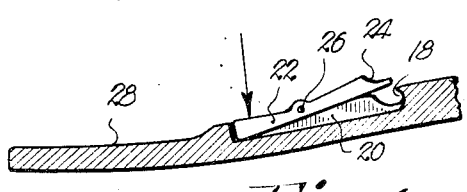
Fig. 4.
Fig. 5.
Fig. 6.
INVENTOR.
Byron R. Fox
BY
ATTORNEY Patented Apr. 17, 1951

2,548,962

UNITED STATES PATENT OFFICE 2,548,962

GYNECOLOGIC INSTRUMENT IN THE NATURE OF A DIAPHRAGM INSERTER

Byron R. Fox, Kansas City, Mo.

Application August 9, 1948, Serial No. 43,221

7 Claims. (Cl. 128—127)

This invention relates to gynecologic instruments of the type adapted for home use and that is designed to facilitate the correct positioning of a diaphragm in the vaginal canal to cover or segregate the uterus from the said vaginal tract.

The principal object of this invention is the provision of a device for introducing an expansible article, such as the well-known diaphgram, into the vagina and in place over the mouth of the uterus, which instrument is contoured and formed in such fashion as to render the same inexpensive to manufacture, efficient to operate and maintain in sanitary condition, and positive in its action, so far as releasing the diaphragm is concerned.

Another primary aim of this invention is to provide a gynecologic instrument in the nature of a diaphragm inserter produced of a sectional body, a terminal section whereof is capable of quick removal and replacement to accommodate diaphragms of different diameters and which section, or any of the sections that may be applied, are equipped with means for joining the same with the body of the instrument so that inherent curvature of the body and section will be continuous.

A still further object of this invention is to provide a diaphragm applying instrument having as a part thereof and supported thereon a quickly-releasable trigger which cooperates with a specially-formed detent and that is readily accessible to the operator when the time arrives to release the diaphragm and as the instrument is in place to position the diaphragm over the mouth of the uterus.

Another important object of the invention is the manner in which the body of the instrument is contoured at the normally outer end thereof to allow the user to determine through the sense of touch that the instrument is in a proper position to release the diaphragm carried thereby.

Other objects of the invention, including specific and important details of construction, will appear during the course of the following specification, referring to the accompanying drawing, wherein:

Fig. 1 is a side elevational view of a gynecologic instrument bearing an extended diaphragm and illustrating the same in place to deposit the diaphragm over the mouth of the cervix.

Fig. 2 is an enlarged top plan view of the instrument bearing an extended diaphragm and that is held ready for insertion into the vagina.

Fig. 3 is a longitudinal, sectional view through the instrument.

Fig. 4 is a fragmentary, longitudinal, sectional view through a portion of the instrument at the trigger zone and showing the said trigger in position where the diaphragm has been released.

Figs. 5 and 6 are side elevational views of two sections that are applicable to the body portion of the instrument to allow the same to accommodate diaphragms of different dimensions.

The prior art teaches and those skilled in the art know that the conventional diaphragm, which is herein broadly designated by the numeral 10, is equipped with a relatively strong, peripheral, marginal edge within which is disposed a coil spring or analogous member 12, which is normally circular and that may be directed to an oval condition as seen in Fig. 2. These diaphragms are, in certain instances, prescribed by the medical profession and are fitted to accommodate the anatomical size of the person using the same.

In many instances, the mouth of the uterus 14 may be adequately covered by the diaphragm 10 and circumscribed by the relatively strong, resilient spring 12 through the employment of a small diaphragm, but, since the sizes range to an appreciable extent, inserting instruments must be alterable to accommodate the various sizes, in order that the said instruments may be commercially practicable.

The instrument illustrated and which embodies the broad concept of my invention comprises an elongated body 16 having a notch 18 formed intermediate the ends thereof and a cavity 20 extending longitudinally along the body 16 and in communication with said notch. Notch 18 is under-cut as clearly shown in Figs. 3 and 4 and, when the diaphragm 10 is in place, as shown in Figs. 2 and 3, spring 12 will lie within notch 18 and accidental displacement will not occur.

Cavity 20 accommodates a trigger or releasing member 22, having a chamfer 24 formed at one end thereof to conform in contour to the bottom portion of notch 18, when trigger 22 is in the position shown in Fig. 3 or "set." A transverse pin 26 extends through trigger 22 and through a portion of body 16 to swingably, rockably, or pivotally carry trigger 22 for movement from the position shown in Fig. 3 to that illustrated in Fig. 4.

The grip portion of body 16 between trigger 22 and one end of said body is provided with a flattened face 28 which serves as a guide to the user. When this flattened face 28 is in an upwardly-directed position, the convexo-concave portion of body 16 and its hereinafter-described section will be disposed as shown in Fig. 1, to position the diaphragm 10 around the mouth of the uterus 14 where a portion of the edge of diaphragm 10 is within the posterior cul-de-sac 30 to the back or inwardly beyond the mouth of uterus 14.

When a proper diaphragm is used and the instrument proper to insert the same is employed, the position of notch 18 will be as shown in Fig. 1, where the edge of diaphragm 10 will be shiftable upwardly and thereby held in the desired position. To accommodate diaphragms of different sizes, the instrument is provided with a removable section 32 having an externally-threaded stem 34 at one end thereof that fits into tapped opening 36 provided in one end of body 16. The opposite end of section 32 has an indentation 38 therein to receive a portion of the edge of diaphragm 10 as clearly shown in Figs. 2 and 3. Thus, when a diaphragm 10 is in place on the instrument, it will be held in a distented condition, for the distance between notch 18 and indentation 38 is greater than the diameter of the spring 12 which forms the marginal edge of diaphragm 10.

Through such elongation or distenting of the diaphragm 10, the same may be inserted into the vagina, as illustrated in Fig. 1, and the portion 28 of body 16 will be outside the confines of the vagina where the trigger 22 may be swung around pin 26 to withdraw the diaphragm edge from within notch 18. Such withdrawal slightly extends the spring 12 to a greater extent than is the case when it is in the position shown in Figs. 2 and 3, and the upward force of trigger 22 upon spring 12 will, of necessity, be great enough to extend the spring slightly and move the same over the overhanging portion of body 16 which provides the under-cut notch 18.

The user accomplishes this releasing action by a downward force upon the end of trigger 22 adjacent this flattened portion 28. Downward force is exerted in the direction of the arrow shown in Fig. 4 and, when the diaphragm is positively without the confines of notch 18, trigger 22 will bear against the bottom of cavity 20. Thus, a limitation of movement is set up which will positively preclude any injurious effect by the swinging of trigger 22.

When the diaphragm 10 is thus released, the instrument is easily and quickly withdrawn from its position shown in Fig. 1. If the diaphragm has extended to a point where the spring exerts enough pressure to hold the same in place, it will not be effected by the withdrawal of the instrument. Figs. 5 and 6 illustrate sections of different lengths from that shown in Fig. 3, for example. The section shown in Fig. 5 is indicated by the numeral 40, and its threaded neck 42 will move into socket 36 of body 16 the same as does section 32 and section 44, which is illustrated in Fig. 6. The indentation 46 in section 40 and the indentation 48 in section 44 are of precisely the same contour and extend transversely across the end of the section as does indentation 38. Threaded neck 50 of section 44 will move into place the same as section 32, if that length of section is desired.

All sections 32, 40 or 44, as the case may be, are arched transversely to the same degree as is body 16, so far as the zone of juncture between the said section and the said body. Thus, the sections and body along said zone are continuous and uninterrupted, and their curvature is common and continuous to a point where a smooth, curved body over all its length is afforded.

In order to facilitate the manufacture of the instrument and to result that the same may be produced at an economical figure, the body and sections are made of round stock bent and milled as illustrated in Fig. 3. Various materials have been employed with success and the curvature is imparted to the body and sections by merely applying heat to the stock from which the article is produced.

The position of pin 26 should be such as to afford the necessary amount of leverage to lift the spring and diaphragm 12 and 10, respectively, from notch 18. This trigger 22 is, likewise, formed of plastic or some material that is nonabsorbent and which will withstand heat to a sufficient degree to sterilize the instrument when such becomes desirable. The threads on neck 34 and within socket 36, for example, are so cut and formed as to result in insuring the proper disposition of indentation 38 and curbed section 32 when the section is normally secured in place.

It is realized that the gynecologic instrument forming the subject matter of this invention and illustrated in the drawing forming a part of this specification might be made in ways different from those shown and set down, all without departing from the spirit of the appended claims.

Having thus described the invention, what is claimed as new and desired to be secured by Letters Patent is:

1. A gynecologic instrument, for applying a diaphragm, comprising an elongated body provided with a transversely disposed indentation across one end thereof, and a notch formed in the side of the body at a point spaced inwardly from the said one end; and a manually shiftable member carried by the body with a portion thereof overlying a portion of the bottom of the notch for lifting the diaphragm therefrom.

2. A gynecologic instrument, for applying a diaphragm, comprising an elongated body provided with a transversely disposed indentation across one end thereof, and a notch formed in the side of the body at a point spaced inwardly from the said one end; and a manually rockable member mounted on the body for lifting the diaphragm from the notch upon manual manipulation of the member, said member having a chamfer, said member being rockable to and from a position where one wall thereof is in register with a part of the wall of the body forming said notch.

3. A gynecologic instrument, for applying a diaphragm, comprising an elongated body provided with a transversely disposed indentation across one end thereof, and a notch formed in the side of the body at a point spaced inwardly from the said one end; and a manually operable trigger rockably mounted in a portion of the said notch and underlying the diaphragm for lifting the diaphragm from the notch upon manual manipulation thereof.

4. A gynecologic instrument, for applying a diaphragm, comprising an elongated body provided with a transversely disposed indentation across one end thereof, and a notch formed in the side of the body at a point spaced inwardly from the said one end; and a manually operable trigger rockably mounted in a portion of the said notch and underlying the diaphragm for lifting the diaphragm from the notch upon manual manipulation thereof, said notch having an undercut portion for engaging a part of the diaphragm, said trigger having a chamfer at one end thereof to underlie a portion of the diaphragm when the latter is in the undercut portion of the notch.

5. A gynecologic instrument, for applying a diaphragm, comprising an elongated body provided with a transversely disposed indentation across one end thereof, and a notch formed in the side of the body at a point spaced inwardly from the said one end; and a manually operable trigger rockably mounted in a portion of the said notch and underlying a portion of the diaphragm for lifting the diaphragm from the notch upon manual manipulation thereof, said notch having an undercut portion for engaging a part of the diaphragm, said trigger having a chamfer at one end thereof to underlie said portion of the diaphragm when the latter is in the undercut portion of the notch, said trigger being rockably mounted on the body and supplied with a thickened section at the opposite end thereof, said thickened section projecting beyond the confines of the notch when the diaphragm is in place upon the chamfer of the trigger.

6. A gynecologic instrument, for applying a diaphragm, comprising an elongated body provided with a transversely disposed indentation across one end thereof, a transverse notch intermediate the ends of the body and a longitudinal cavity in the body in communication with the said notch; and a manually operable trigger pivotally mounted on the body within the cavity, said trigger having a chamfer on one end underlying the diaphragm when the same is in the notch, the opposite end of the trigger being held projected outwardly from the body by the diaphragm when a portion thereof is in the notch.

7. A gynecologic instrument, for applying a diaphragm, comprising an elongated body provided with a transversely disposed indentation across one end thereof, a transverse notch intermediate the ends of the body and a longitudinal cavity in the body in communication with the said notch; and a manually operable trigger pivotally mounted on the body within the cavity, said trigger having a chamfer on one end underlying the diaphragm when the same is in the notch, the opposite end of the trigger being held projected outwardly from the body by the diaphragm when a portion thereof is in the notch, said body being substantially circular in cross-section and having a flat area formed thereon along a portion of the length of the body between the trigger and said opposite end and along the side of the body from which the trigger is projected by the diaphragm.

BYRON R. FOX.

REFERENCES CITED

The following references are of record in the file of this patent:

UNITED STATES PATENTS

| Number | Name | Date |
|---|---|---|
| 2,101,875 | Schleicher | Dec. 14, 1937 |
| 2,446,724 | Schmitz | Aug. 10, 1948 |